Patented Sept. 16, 1952

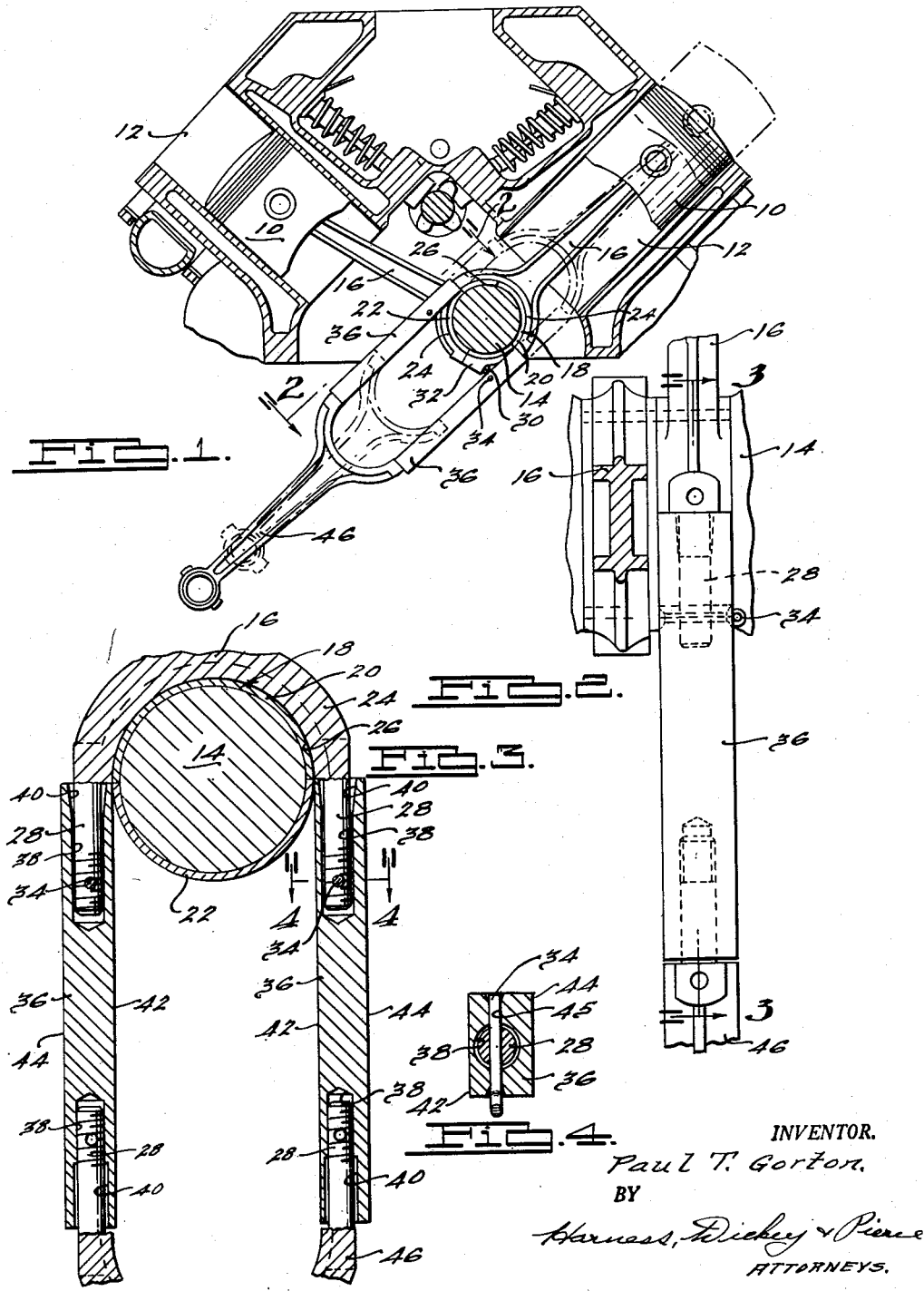

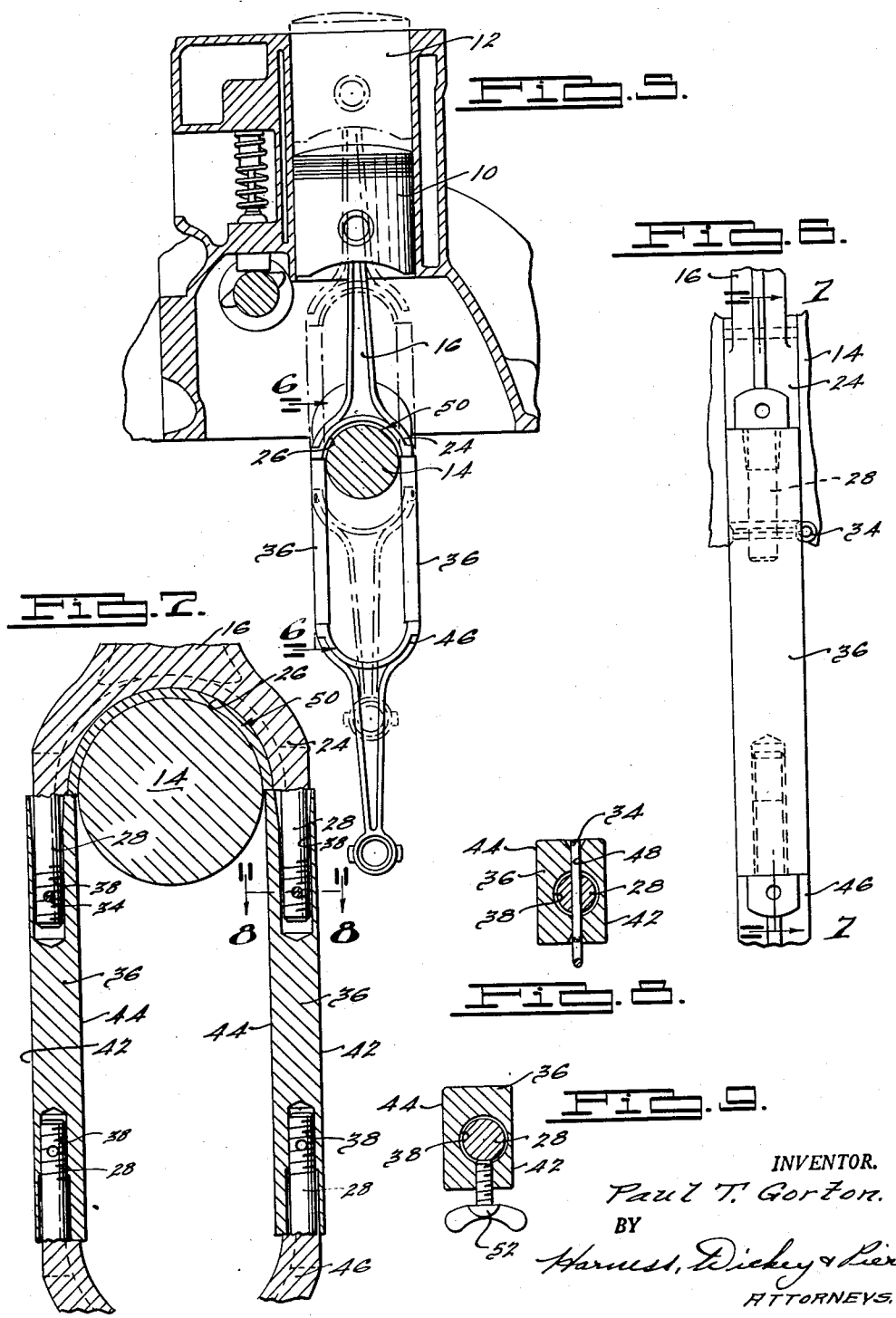

2,610,391

UNITED STATES PATENT OFFICE 2,610,391

TOOL FOR ASSEMBLING AND DISASSEMBLING CONNECTING RODS AND THEIR BEARINGS

Paul T. Gorton, Grosse Pointe, Mich., assignor to Federal Mogul Corporation, Detroit, Mich., a corporation of Michigan Application August 19, 1947, Serial No. 769,340

4 Claims. (Cl. 29—283)

1

This invention relates broadly to tools and more particularly to a novel tool for assembling and disassembling connecting rods in automotive vehicles and the like.

In conventional internal-combustion engines, each piston and its connecting rod is diassembled as a unit after the crankcase and cylinder head have been removed by removing the cap which fastens the connecting rod to the crankshaft and driving the assembly from below upwardly and out through the cylinder. Similarly, the piston and connecting rod is assembled by inserting the same downwardly into the cylinder and then pulling on the connecting rod from below to bring the same into proper relationship with the crankshaft. In practice, carbon deposits on the cylinder walls and other causes frequently cause the piston to stick; and it usually is necessary to drive the piston out of the cylinder by hammering against the lower end of the connecting rod or against a bar or the like which is abutted against the connecting rod. As a result of this condition and the cramped quarters in which the mechanic must work, the threads on the studs which normally fasten the cap to the connecting rod frequently are damaged, and in addition, the connecting rod bearing and the crankshaft pins adapted to receive them frequently are scored, dented, or otherwise damaged either by the studs or by the tool used to drive the piston out of the cylinder.

An important object of the present invention is to provide a tool which will permit piston and connecting rod assemblies to be expeditiously assembled or disassembled.

Another object of the invention is to provide a tool of the above-mentioned character which can be easily applied to or removed from the connecting rod.

Still another object of the invention is to provide a tool of the above-mentioned character which protects the threaded studs of the connecting rods and also prevents damage to the connecting rod bearings and crankshaft pins during both assembly and disassembly of the pistons.

Yet another object of the invention is to provide a tool of the above-mentioned character which is adjustable on the connecting rod to either engage or release the crankshaft bearings so that the latter may be left on the crankshaft or removed with the connecting rod, depending upon the particular construction of the engine and the exigencies of the particular situation.

A further object of the invention is to provide a tool of the above-mentioned character which

2 is mechanically simple and inexpensive to manufacture but exceedingly efficient in operation.

Other objects and advantages of the invention will be apparent during the course of the following description.

In the drawings forming a part of this specification and wherein like numerals are employed to designate like parts throughout the same:

Fig. 1 is a fragmentary, transverse sectional view through a conventional V-type automobile engine showing a tool embodying the present invention applied to one of the connecting rods and positioned to prevent injury to the connecting-rod bearing which remains on the crankshaft;

Fig. 2 is a longitudinal sectional view taken on the line 2—2 of Fig. 1;

Fig. 3 is a fragmentary, vertical sectional view taken on the line 3—3 of Fig. 2;

Fig. 4 is a transverse sectional view taken on the line 4—4 of Fig. 3;

Fig. 5 is a transverse sectional view through another type of internal-combustion engine conventionally used in automotive vehicles in which a portion of each connecting-rod bearing is removable with the connecting rod and illustrating a tool embodying the present invention positioned to hold one of the bearing portions or shells in fixed association with the connecting rod with which it is associated during assembly or disassembly thereof;

Fig. 6 is a fragmentary, enlarged, vertical, longitudinal sectional view taken on the line 6—6 of Fig. 5;

Fig. 7 is a fragmentary, vertical, transverse sectional view taken on the line 7—7 of Fig. 6;

Fig. 8 is a transverse sectional view taken on the line 8—8 of Fig. 7; and

Fig. 9 is a view similar to Fig. 8 but showing a modified construction for holding the tool on the connecting rod stud.

For a detailed description of the invention, reference is first had to Figs. 1–4 which show a standard, internal-combustion, V-type engine having pistons 10 mounted for reciprocation in cylinders 12 and driven by the crankshaft 14 through the usual connecting rods 16. In the engine here shown by way of illustration, two pistons 10 are driven by each crankpin of crankshaft 14, and a single sleeve bearing 18 is interposed between the crankshaft 14 and the connecting rods 16 of each pair of pistons. The sleeve bearing 18 conventionally is split lengthwise to provide two complementary shells 20 and 22. The connecting rods here shown are conventional, and the big ends 24 thereof have the usual concave inner surfaces 26 which fit over approximately half of the bearing 18 and the usual externally screw-threaded studs 28 which project at opposite sides of the crankshaft 14 and, together with the nuts 30, fasten the cap portions 32 of the connecting rods. In the engine here shown by way of illustration, cotter pins 34 extend transversely through the studs 28 and nuts 30 to lock the latter. The bearings 18 are free to rotate on the crankshaft 14 and in the connecting rods 16. As suggested, the engine construction here shown is conventional; for that reason only so much of the engine as pertains to the instant invention is described in detail.

The procedure for assembling or disassembling the pistons 10 and the difficulties attendant upon these operations have already been described. In Fig. 1, I have shown one of the connecting rods 16 still attached to the crankshaft 14; whereas the cap 32 is shown removed from the other connecting rod 16, and a tool embodying the present invention is applied thereto.

Specifically, the tool embodying the present invention comprises two identical extension bars 36 which conveniently can be made of standard metal bar stock and preferably are either bronze or aluminum. The bars 36 may be any suitable length, but they preferably are relatively long, as shown in the drawing, and they should be at least longer than the stroke of the engine. Each extension bar 36 is provided in each end thereof with a socket 38, and both sockets 38 are sufficiently large in diameter to receive and sufficiently deep to entirely accommodate the studs 28. Also, the outer terminal portions of the sockets 38 preferably are flared or counterbored, as at 40, to facilitate insertion thereof over the studs 28, as shown in Fig. 3. One socket 38 in each extension bar 36 is internally screw-threaded to engage the external threads of studs 28; whereas the other socket 38 in each extension bar is plain and sufficiently large to slide easily over the threaded studs 28. According to the present invention the two sockets 38 in each extension bar 36 are positioned with respect to the side 42 of the latter so that when the bar is applied to a stud 28 with the side 42 to the inside as shown in the drawing, such side 42 extends flush or substantially flush with the concave end surface 26 of the connecting rod 16. If the extension bars 36 are to be used only for assembling or disassembling pistons in engines of the type hereinabove described, it is immaterial how far the sockets 38 are spaced from the opposite sides 44 of extension bars 36, since in engine constructions of this type the bearings 18 remain on the crankshaft 14 and the bars 36 are mounted with the sides 42 innermost, both when assembling and disassembling the pistons 10. When the extension bars 36 are fully inserted on studs 28, transverse bores 45 therein align with the cotter-pin holes on the studs so that cotter pins 34 can be inserted therethrough to fasten the bars on the studs.

In practice, the extension bars 36 are used together with another, preferably old and discarded, connecting rod 46 when assembling or disassembling the pistons 10. In the drawing, the extension bars 36 are shown attached to the right piston 10 (Fig. 1) for assembling the latter in the engine.

To assemble a piston 10, the extension bars 36 are first threaded onto the studs of connecting rod 46. The piston 10 and connecting rod 16 to be assembled are then inserted downwardly into the cylinder 12 until the studs 28 project from the lower end of the cylinder. This operation usually can be accomplished manually and with relative ease, and care is exercised not to insert the piston far enough to bring the studs 28 or any part of the connecting rod 16 into engagement with the corresponding crankpin of the crankshaft. The bearing 18 is then applied to the corresponding crankpin of the crankshaft and while held in place by hand the yoke defined by the pre-assembled bars 36 and rod 46 is then slipped over the crankpin 14 in embracing relation thereto and with the sides 42 of the bars innermost in the manner hereinabove described. When thus positioned, extension bars 36 snugly receive the connecting-rod bearing 18 and the bars may be advanced sufficiently to slip the large unthreaded sockets 38 at the distal ends thereof over the studs 28 of the connecting rod 16. Cotter pins 34 are then inserted through the transverse bores 48 and the aligning cotter-pin holes in the studs 28 to fasten the extension bars 36 to the studs. The bearings 18 as well as the threaded studs 28 are then protected, and the piston 10 can be pulled the rest of the way into cylinder 12 without danger of damaging either the bearings or the studs. During the final movement of the piston into the cylinder the smooth inner surfaces 42 of extension bars 36 slide across the bearing 18 and guide the big end thereof to seating position against the bearing and to substantially the position shown in Fig. 3. The cotter pins 34 are then removed, extension bars 36 disengaged from studs 28, and the cap 32 assembled on the connecting rods 16 in the conventional manner.

To disassemble the piston 10 and the attached connecting rods 16, the cap 32 is removed, and the yoke defined by preassembled extension bars 36, and connecting rod 46 is then applied to the exposed studs 28 in the manner hereinabove described. The piston 10 can then be driven easily from the cylinder 12 by hammering against the end of connecting rod 46 without danger of damaging either the bearing 18 or the external threads of studs 28. Moreover, it will be readily apparent the end of connecting rod 46 is positioned far enough below the crankshaft 14 so that it is readily accessible for hammering. The extensions 36 are interengaged with studs 28 in such manner that they can not possibly be deflected against the bearing 18 by hammering against the connecting rod 46, and the distal end of the latter is so far removed from the crankshaft that there is little danger of the hammer inadvertently striking the crankshaft 14 or bearing 18. The assembly is driven upwardly until the top ring of the piston is clear of the bore of the cylinder, at which time the extension bars 36 may be readily removed and the piston 10 can be readily removed from the cylinder 12.

Reference is now had to Figs. 5–8 which show another standard type of internal-combustion engine in which the connecting rods 16 are mounted somewhat differently on the crankshaft 14 and which illustrate how extension rods 36 embodying the present invention are readily adapted to the modified engine construction. In the internal-combustion engine shown in Fig. 5, only one piston 10 is actuated by each throw of the crankshaft 14, and a single bearing 50 is interposed between the crankshaft and the connecting rod big end 24. The connecting rod 16 of course may be identical to the one hereinabove described and is similarly attached to the crankshaft 14. In this type of engine construction, however, the sleeve bearing 50 conventionally is split longitudinally, and the two shells are detachably fastened to the connecting rod big end 24 and to the cap 32 (not shown). According to standard practice, a projection is struck radially from each bearing shell, and these projections fit in correspondingly shaped recesses in the big end 24 and cap 32 to mechanically lock the shells associated therewith against movement with respect to the connecting rod. In an engine construction of this type, one bearing shell is removed with the cap and the problem is to assemble or disassemble the piston 10 without damaging the bearing shell associated with connecting rod 16, the surface of the connecting rod which mates with the cap, the studs 28, or the crankpin.

In order to adapt the extension bars 36 for both the engine constructions herein described, the sockets 38 also are uniquely spaced with respect to the sides 44 of the bars so that when the latter are applied to studs 28 with the sides 44 to the inside as shown in Fig. 7, the applied ends of the bars abut against both the connecting rod and the bearing shell 50 but clear the crankpin on which the bearing shell is mounted. In other words, when thus positioned, the bars 44 project inwardly beyond the concave end surface 26 of the connecting rod 16 so that they not only fully cover and protect the studs 28 but also hold the bearing shell 50 associated with the connecting rod. At the same time, the inner sides 44 of extension bars 36 are spaced sufficiently to clear and protect the crankshaft 14.

In use, the extension bars 36 are assembled on an old connecting rod 46 and used identically as described in connection with the first form of the invention to both assemble and disassemble the piston 10. Therefore, a detailed description of the mode of use of the extension bars for the construction shown in Fig. 5 is unnecessary.

In some engine constructions self-locking nuts 30 are employed, and in these constructions cotter pins 34 are not used and the studs 28 of course are not provided with cotter-pin holes. If cotter pins 34 are not used, the extension bars 36 conveniently may be equipped with set screws 52 which are located to enter one side of the unthreaded sockets 38 and to clampingly engage the studs 28 preferably above the threaded portions thereof. The set screws 52 here shown are provided with wing heads to facilitate manual manipulation thereof.

For factory use or in any circumstance where a large number of similar engines are to be worked upon, it may be desirable to form the extension bars 36 integral with a yoke portion which serves the same purpose as the connecting rod 46. Such a construction is considered to be within the scope of the present invention.

From the foregoing it will be readily apparent that I have accomplished the objects of my invention. I have provided a tool which is mechanically simple and inexpensive to manufacture but is exceedingly efficient in accomplishing its intended purpose. When applied to a connecting rod 16 for the purpose either of assembling or disassembling a piston 10, the extension bars 36 entirely enclose and fully protect the threaded portions of studs 28; and in addition, they prevent damage to the connecting rod bearings 18. Moreover, the single extension bar 36 here shown is adapted for use on any of the connecting-rod mountings herein described. In use it is merely necessary to turn the extension bars 36 one hundred eighty degrees to convert it for use with one or the other of the connecting-rod mountings. Not only do the extension bars protect the studs 28 and bearings 18 which heretofore have been extensively damaged when assembling or disassembling the pistons 10, but they greatly facilitate and expedite these operations.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. An extension bar having a socket in each end thereof, each socket being adapted to fit over and entirely accommodate the standard connecting rod stud, and means for fastening said bar to connecting rod studs disposed in said sockets, both sockets being disposed correspondingly eccentrically of the bar and closer to one side than the other thereof, the distance between the centers of said sockets and said one side of the bar being not greater than the standard distance between the center of the connecting rod stud and the adjacent arcuate bearing seat of the connecting rod, and the distance between the centers of said sockets and the other side of the bar being greater than the standard distance between the center of the connecting rod stud and the adjacent arcuate bearing seat of the connecting rod but not greater than the standard distance between the center of the connecting rod stud and the adjacent arcuate inner surface of the connecting rod bearing.

2. An extension bar having a socket in each end thereof, one of said sockets being internally threaded and adapted to be screwed on a connecting rod stud, the other of said sockets being larger in diameter than a connecting rod stud so that the stud can be inserted axially therein, and means for fastening said bar to a connecting rod stud disposed in said relatively large last-mentioned socket, both of said sockets being disposed correspondingly eccentrically of the bar and closer to one side than the other thereof, the distance between the centers of said sockets and said one side of the bar being not greater than the standard distance between the center of the connecting rod stud and the adjacent arcuate bearing seat of the connecting rod and the distance between the centers of said sockets and said other side of the bar being greater than the standard distance between the center of the connecting rod stud and the adjacent arcuate bearing seat of the connecting rod but not greater than the standard distance between the center of the connecting rod stud and the adjacent arcuate inner surface of the connecting rod bearing.

3. An extension bar as defined in claim 2 wherein said fastening means comprises a transverse bore intersecting said relatively large socket and positioned to align with the transverse cotter pin opening with which connecting rod studs conventionally are provided.

4. An extension bar as set forth in claim 2 wherein said fastening means comprises a transverse, internally threaded hole in the bar and in register with said relatively large socket and a set screw in said hole adapted to engage a connecting rod stud therein to hold said bar on the stud.

PAUL T. GORTON.

(References on following page)

REFERENCES CITED

The following references are of record in the file of this patent:

UNITED STATES PATENTS

| Number | Name | Date |
|---|---|---|
| 183,425 | Smith | Oct. 17, 1876 |
| 339,534 | Dickson | Apr. 6, 1886 |
| 540,834 | Gumm | June 11, 1895 |
| 1,048,485 | Bennett | Dec. 31, 1912 |
| 1,073,614 | McDearmid | Sept. 23, 1913 |
| 1,293,383 | Eaton | Feb. 4, 1919 |
| 1,984,026 | Little | Dec. 11, 1934 |
| 2,048,187 | Hughes | July 21, 1936 |
| 2,193,458 | Koenig | Mar. 12, 1940 |
| 2,281,349 | Brewin | Apr. 28, 1942 |
| 2,508,047 | Starnes | May 16, 1950 |

FOREIGN PATENTS

| Number | Country | Date |
|---|---|---|
| 627,914 | France | June 20, 1927 |
| 662,633 | France | Mar. 25, 1929 |